Aug. 10, 1965

J. SCOFIELD, JR 3,199,695

SMALL CRAFT TRAILER AND LAUNCHER

Filed Dec. 18, 1962

INVENTOR.
JOSEPH SCOFIELD, JR.

BY

W. J. Gribble
ATTORNEY

Aug. 10, 1965     J. SCOFIELD, JR     3,199,695
SMALL CRAFT TRAILER AND LAUNCHER
Filed Dec. 18, 1962     6 Sheets-Sheet 2
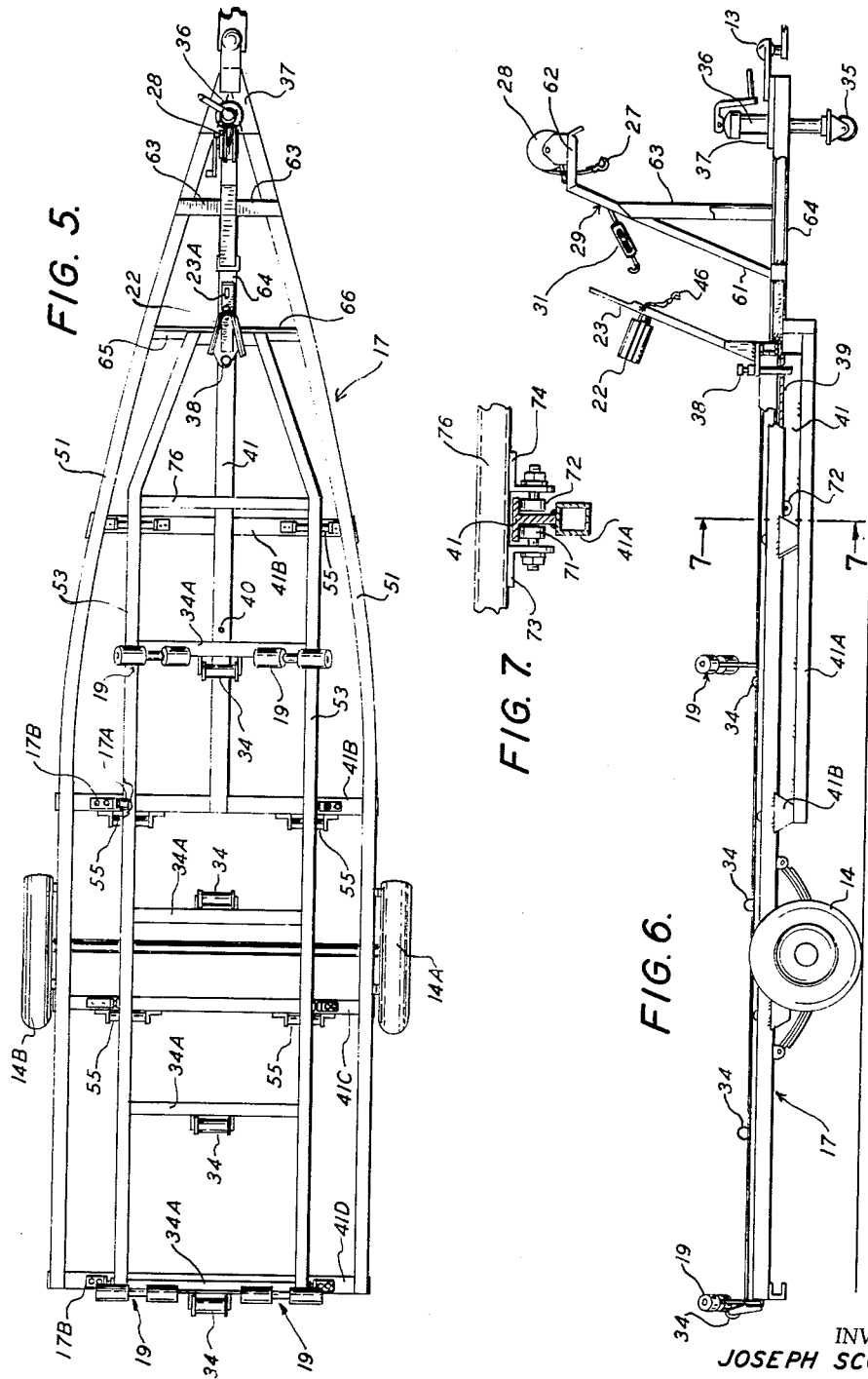
INVENTOR.
JOSEPH SCOFIELD, JR.
BY
W. J. Gribble
ATTORNEY Aug. 10, 1965  J. SCOFIELD, JR  3,199,695
SMALL CRAFT TRAILER AND LAUNCHER
Filed Dec. 18, 1962  6 Sheets-Sheet 3
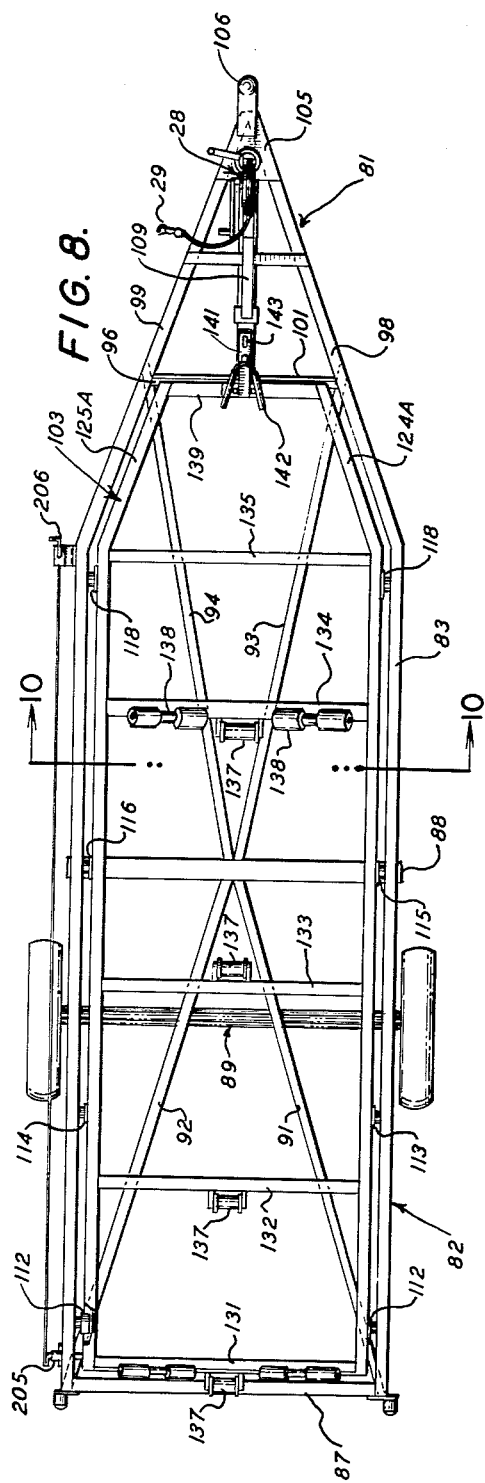
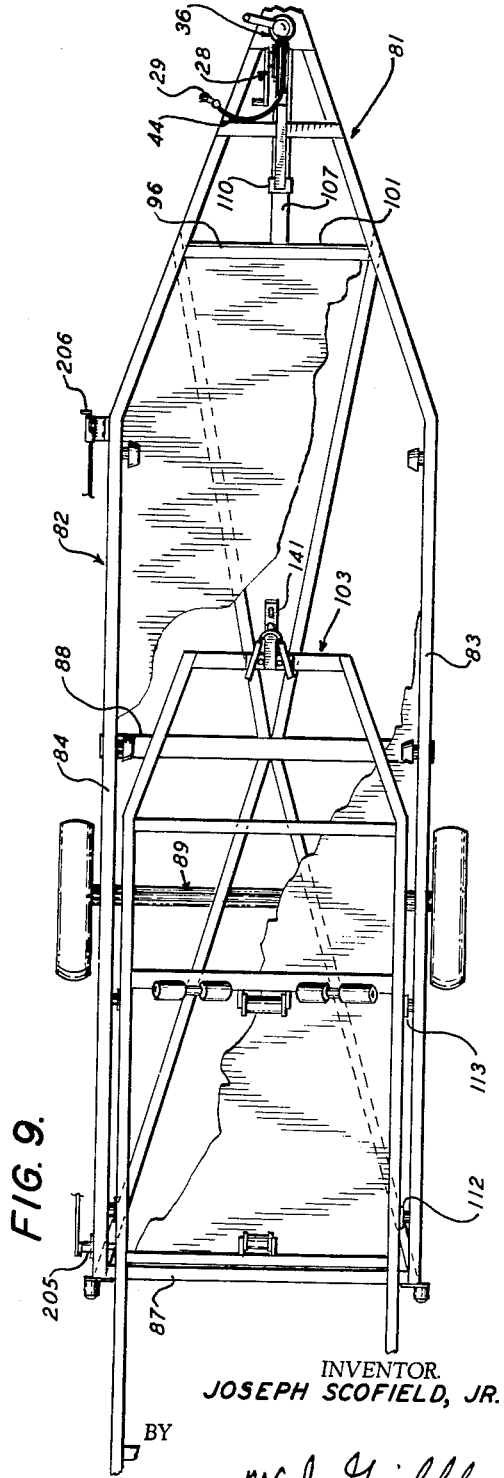
INVENTOR.
JOSEPH SCOFIELD, JR.
BY
W. J. Gribble
ATTORNEY

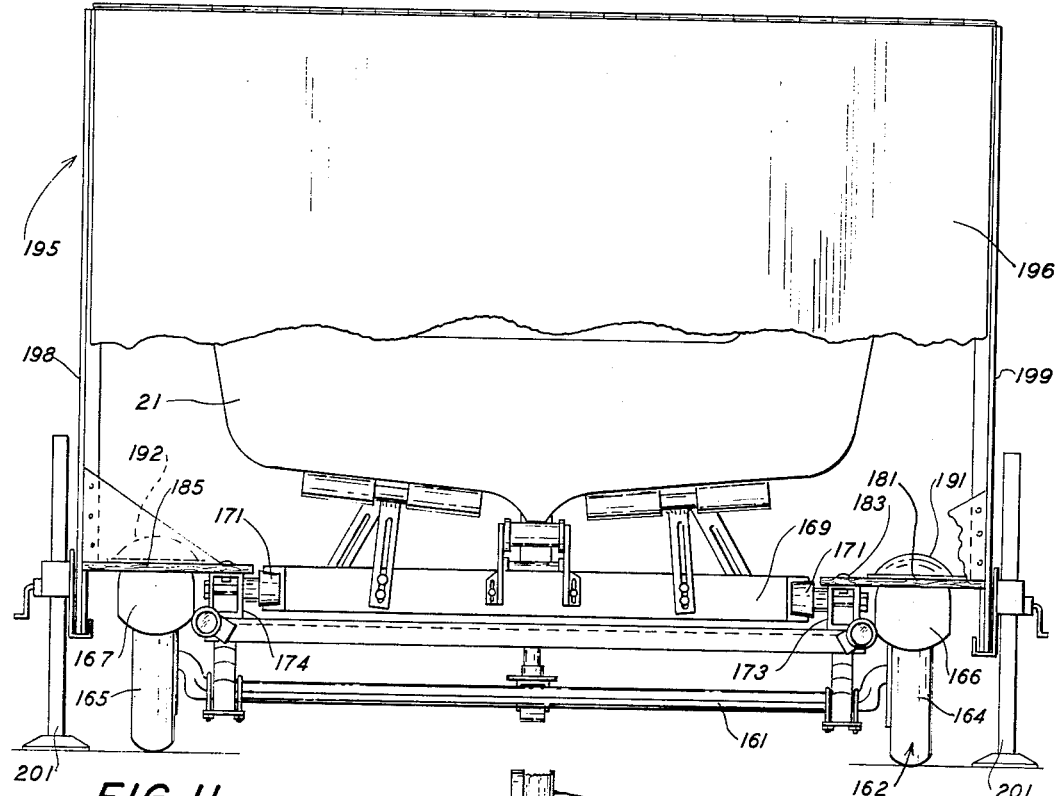
FIG. 11.
FIG. 10.
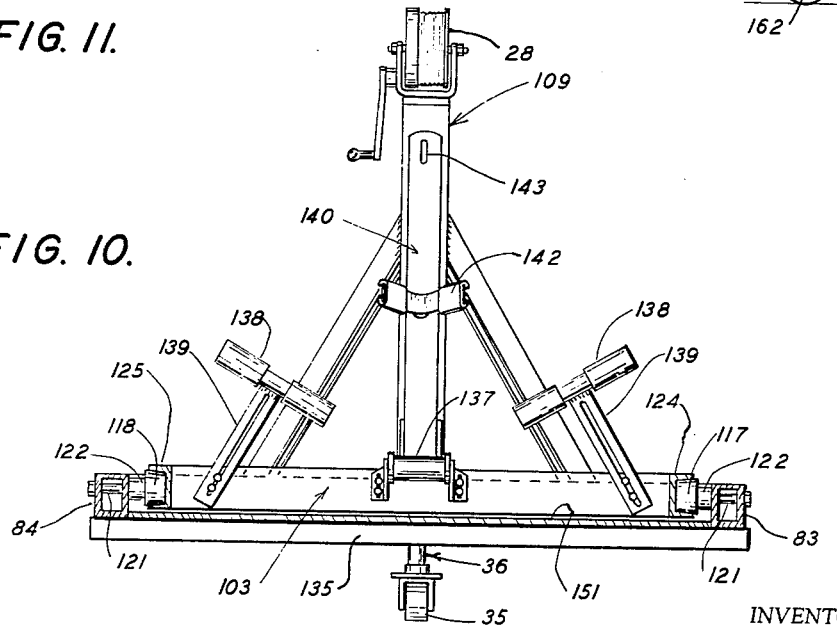
GROUND LINE (REF.)
INVENTOR.
JOSEPH SCOFIELD, JR.
BY
W. J. Gribble
ATTORNEY

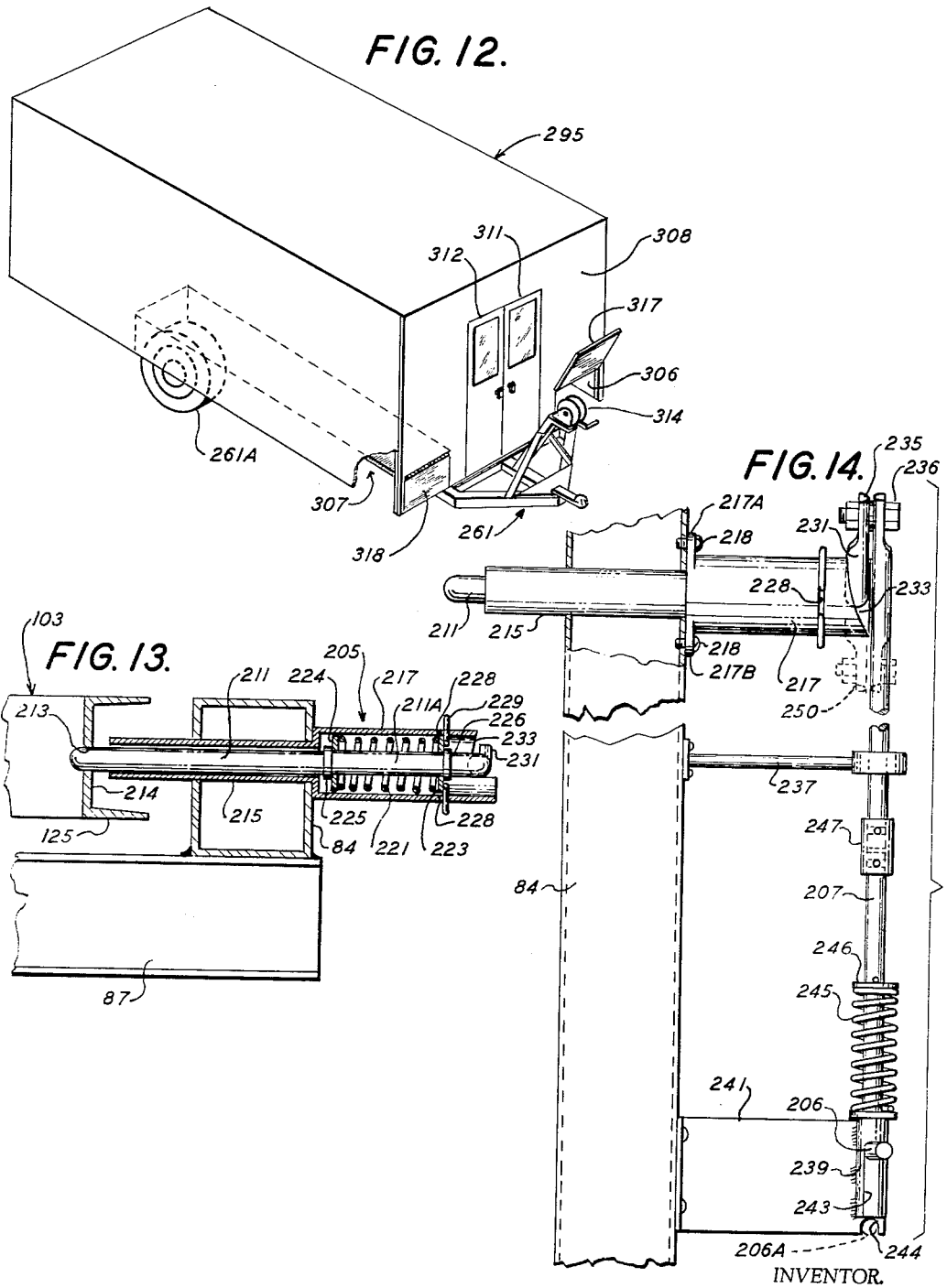

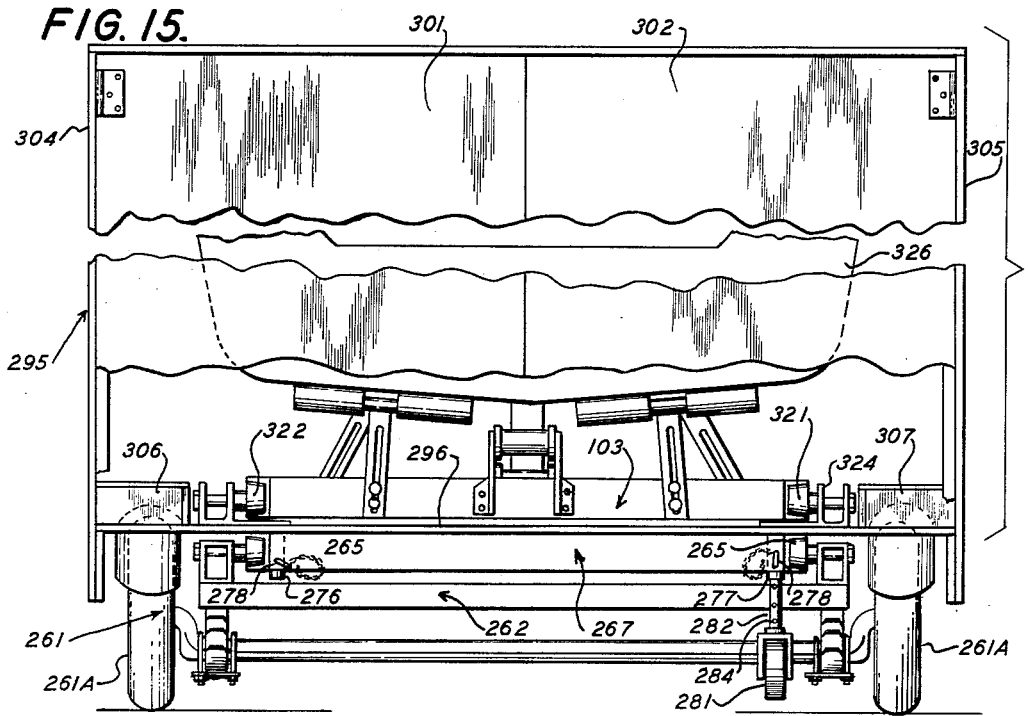
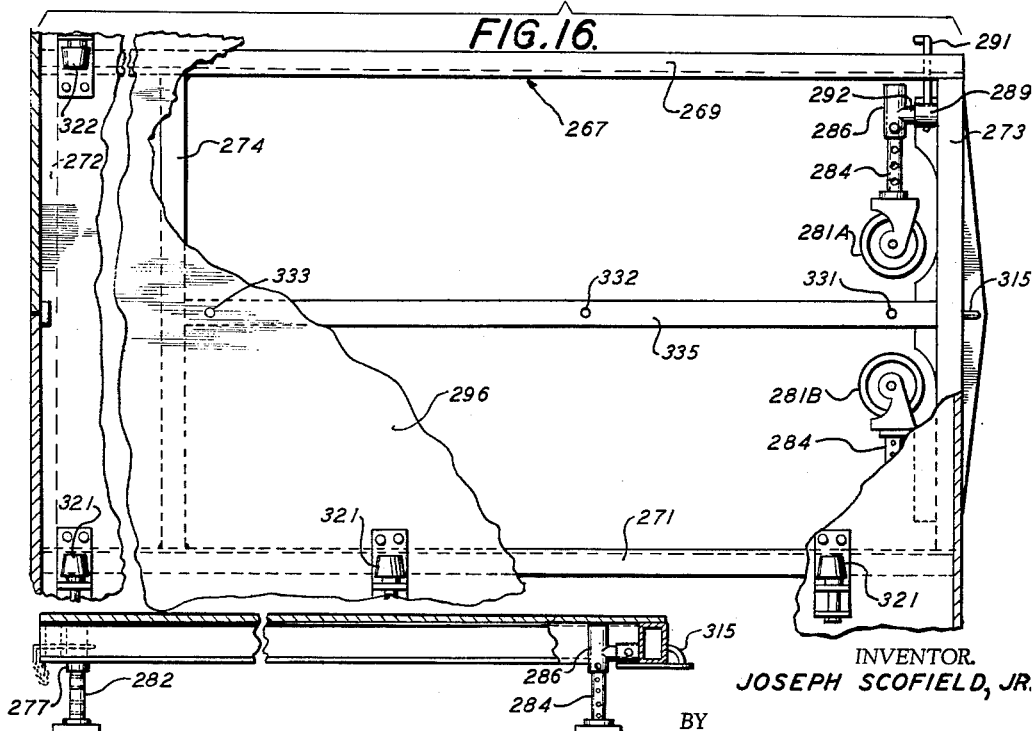

3,199,695
SMALL CRAFT TRAILER AND LAUNCHER
Joseph Scofield, Jr., 1614 Perkins Drive, Arcadia, Calif.
Filed Dec. 18, 1962, Ser. No. 245,518
2 Claims. (Cl. 214—506)

The invention relates to trailers for hauling small craft or boats on highways and, more particularly, to such trailers adapted to launch the small craft therefrom directly into the water.

At present, conventional boat trailers accommodate small craft from 10 to 25 feet in length and are capable of transporting such boats along the highway. Many such trailers are equipped with boat or saddle rollers mounted to the trailer chassis and arranged to support the craft by contact with the keel and bottom thereof. The rollers are usually elongate, resilient and oriented to fit against the shaped bottom of the boat on a transverse line thereof. Means are conventionally provided on the trailer to lock the boat in position on the rollers as it traverses the highway.

In most instances the boat is launched from the trailer by backing the trailer into the water at a suitably sloped shore line. The boat is then pushed from the trailer into the water by one or more men standing in the water beside the partially submerged trailer. Difficulties arising from launching from such trailers are numerous. One difficulty arises from the fact that the trailer wheels must rest upon the soft footing under water. Pulling the trailer from this soft base after the weight of the trailer and boat has embedded the wheels can be a serious difficulty. A second inconvenience is that the boat operator is required to wade into the water in order to launch the craft properly. Additionally, trailer wheel bearings may be permanently damaged because the water washed lubricants from the submerged wheels with consequent heavy wear on the unlubricated bearings at highway speeds.

I have invented apparatus for hauling small craft or boats on the highway and for launching such craft directly into the water from the trailer without submerging the trailer wheels, and without obligating the boat operator to enter into the water during launch. The invention comprises a wheeled trailer for highway use having a boat supporting carriage movable longitudinally of the trailer. The carriage has saddle or boat rollers adapted to support adequately the particular boat for which the carriage is to be used. Locking means on the carriage secure the boat thereto. Means are provided on the trailer for locking the carriage in selected positions longitudinally of the trailer. Preferably the carriage has outwardly opening channels on each of its longitudinal sides adapted to mate with carriage support rollers fixed to the trailer chassis. The carriage also preferably has attached thereto a bow yoke in which the bow of the boat registers. A hand or power winch is suitably mounted to the front or hitch end of the trailer. Preferably the trailer is equipped with a forward ground wheel that is movable up and down so that it may be moved upwardly out of contact with the road when the trailer is on the highway.

The scope of the invention encompasses a boat launching trailer also having an enclosure-bearing carriage movable longitudinally thereon. A conventionally shaped camper enclosure may be secured either permanently or temporarily to a movable carriage upon the trailer. Preferably the enclosure carriage has auxiliary wheels for off-trailer movement. The camper floor has a plurality of spaced rollers fixed thereto in opposed rows. The rows are spaced apart the same distance as the carriage support rollers on the trailer. A boat carriage similar to that previously described may then move upon the rollers fixed to the camper floor and be enveloped within the camper enclosure. The boat carriage is equipped with conventional saddle and keel rollers oriented to receive a particular small craft.

The rear of the enclosure preferably has doors that open for launching the boat or removing the boat carriage. Both the enclosure carriage and the boat carriage may have removable wheels for movement off the trailer chassis. Thus, either the camper enclosure carriage or the boat carriage may be used singly upon the trailer chassis or moved independently along the ground. The trailer of the invention may transport a camper enclosure to a chosen site or, alternatively, may be used to transport a launching carriage and a small craft to a launching site. Further, the three components, i.e., the trailer, the boat carriage and the camper carriage, may be combined in a dual purpose unit in which the trailer supports a camper carriage that in turn supports and encloses a boat carrier and boat.

These and other advantages of the invention are apparent from the following detailed description and drawing in which:

FIG. 5 is a plan view of an embodiment of the invention showing the boat or small craft carriage retracted within the confines of the trailer;

FIG. 6 is a side elevation of the embodiment of FIG. 5, partly broken away, showing the lock pin securing the carriage to the trailer;

FIG. 7 is a fragmentary sectional elevation taken along line 7—7 of FIG. 6;

FIG. 8 is a plan view of a preferred embodiment of the invention showing the boat carriage in road position upon the trailer;

FIG. 9 is a fragmentary plan view, partly broken away, of the embodiment of FIG. 8 and showing the boat carriage longitudinally displaced upon the trailer;

FIG. 10 is a detail sectional elevation taken along line 10—10 of FIG. 9;

FIG. 11 is a rear elevational view, partly broken away, of an alternate embodiment of the invention combining the trailer with a camper enclosure and carriage;

FIG. 12 is a schematic perspective view of a trailer and camper embodiment of the invention similar to the embodiment of FIG. 11;

FIG. 13 is a fragmentary sectional elevation of a preferred locking pin for locating a carriage with respect to the trailer chassis;

FIG. 14 is a plan view of the locking pin assembly of FIG. 13 and its control;

FIG. 15 is a fragmentary rear elevation, partly broken away, of a further alternate embodiment of the invention combining camper and boat carriages upon a single trailer;

FIG. 16 is a fragmentary plan section of the camper and carriage of the embodiment of FIG. 15; and FIG. 17 is a fragmentary sectional elevation taken along lines 17—17 of FIG. 16.

Figure 1:
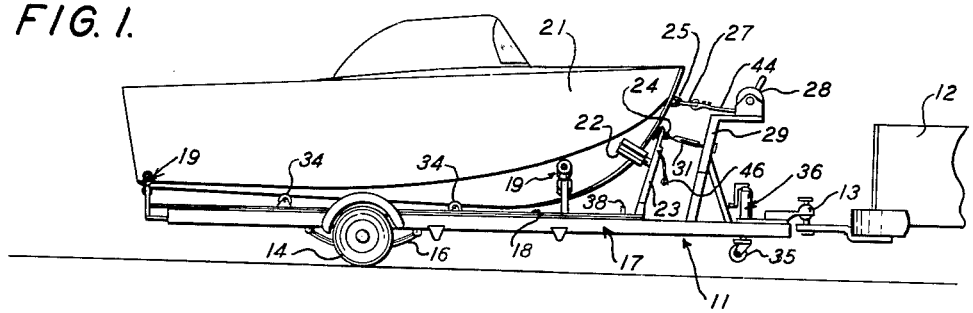
FIG. 1 illustrates in elevation the trailer of the invention transporting a small craft along a highway.

FIGS. 1–6 illustrate a highway trailer 11 for launching a small craft and also show steps in the launching procedure. The trailer is attached to a towing vehicle 12 by a conventional ball hitch 13. A pair of wheels 14 are attached by conventional axle and springs 16 to the trailer chassis 17. A plurality of rollers 17A upon the trailer chasis guide a boat carriage 18. The boat carriage has a plurality of saddle rollers 19 that support a boat such as the boat 21 of FIGS. 1–4. A bow yoke 22 is fixed to a vertical stanchion 23 on the boat carriage. A lower bow ring 24 on the boat protrudes through aperture 23A of the stanchion and affords one means of locking the boat in position on the boat carriage.

An upper bow ring 25 is engaged by a snap hook 27 attached to the line of a winch 28. The winch rests upon a support 29 fixed to the hitch end of the trailer chassis. An adjustable threaded link 31, pivoted at one end to support 29, is hooked through lower bow ring 24 in FIG. 1, illustrating the configuration of the boat and trailer assembly when the trailer is being towed on the highway.

A plurality of keel rollers 34 (see FIG. 5) are fixed along the central line of the carriage to transverse carriage supports 34A and combine with the saddle rollers to support the boat. A jacking wheel 35 at the hitch or front end of the trailer may be cranked up and down by means of a crank and screw assembly 36 fixed to a horizontal web plate 37. The boat carriage has a locking pin 38 which registers in the holes 39 or 40 of a central stringer 41 of the trailer chassis, depending upon the position the boat carriage occupies on the trailer. The stringer is supported from a beam 41A that depends from transverse framing members 41B of the trailer chassis.

In FIG. 1 the boat carriage is in road position and pin 38 is in forward hole 39. Jacking wheel 35 is cranked up and the boat and trailer are roadable.

Figure 2:
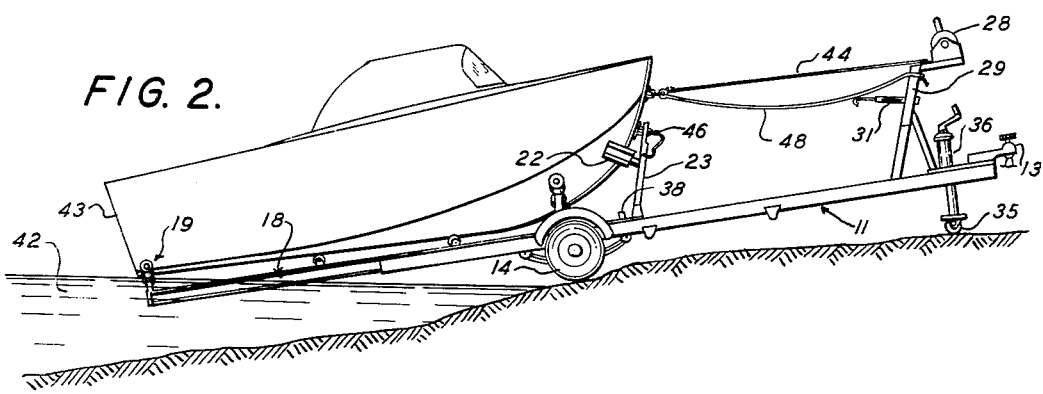
FIG. 2 illustrates an embodiment of the invention in which the carriage supporting the small craft has been displaced longitudinally of the trailer so that the craft is cantilevered out over the water.

In FIG. 2 trailer 11 is backed up to a body of water 42. The wheels 14 rest upon dry land. Boat carriage 18 is displaced rearwardly upon the trailer chassis so that the stern 43 of the boat overhangs the water. Pin 38 is now in registry hole 40.

Normally the slope of the shore at a launch site is sufficient to overcome the friction of the boat carriage and saddle rollers. Once link 31 has been detached from bow ring 24, winch 28 and its line 44 may be used to control rearward longitudinal motion of the boat and boat carriage on the trailer chassis. During the launching operation a snap ring 46 may be fixed through the loop of lower bow ring 24 after link 31 is removed, so that the boat is still fixed within yoke 22 on the carriage. (See FIG. 2.) Crank assembly 36 may be used to lower wheel 35 and raise the hitch end of the trailer sufficiently to remove the trailer weight from the springs of the towing vehicle. Rear saddle rollers 19 are thus depressed to water level.

Figure 3:
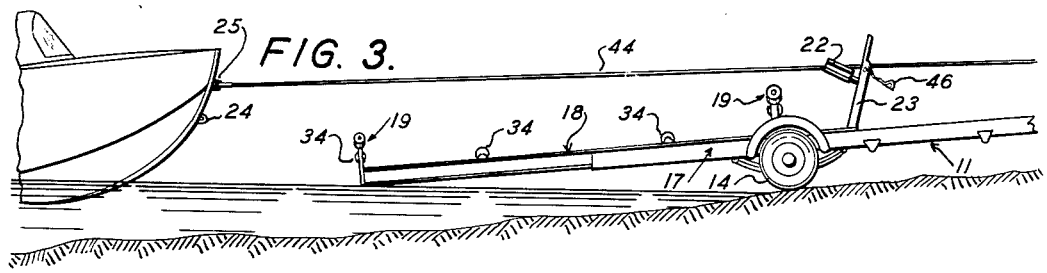
FIG. 3 shows the trailer and small craft after the craft has separated from its carriage.

In certain instances crank 36 need not be used. The weight of the boat, cantilevered on its carriage beyond wheels 14, is sufficient to rock the trailer against the spring load of the vehicle. After a hand line 48 is attached to ring 25, snap ring 46 may be removed, freeing the boat from the boat carriage so that it may roll on saddle rollers 19 and, under control of winch 28, into the water from the carriage. At this point (or earlier) with hand line 48 in place, winch line 44 may be removed, and the boat may still be controlled from the shore, as shown in FIG. 3. The carriage may be winched back to its road position on the trailer and locked by pin 38. The trailer may then be towed by the vehicle to a parking area to await the time when the boat is to be removed from the water.

Figure 4:
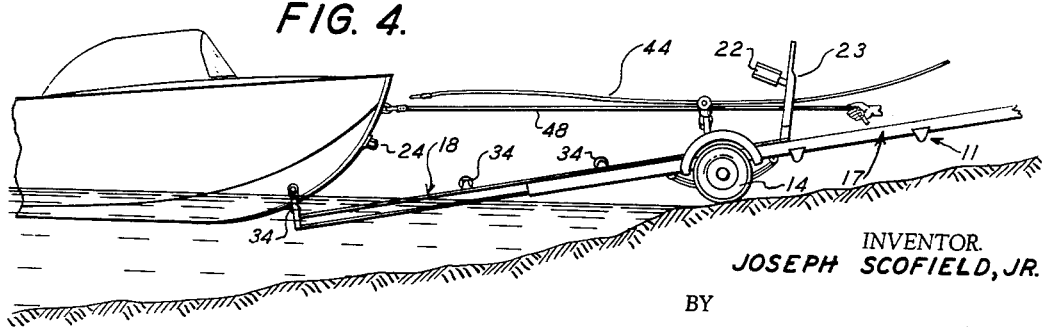
FIG. 4 illustrates in elevation the first step in mounting the boat from the water onto the boat carriage.

FIG. 4 illustrates the first stage of reloading the boat. The hand line is still attached to upper bow ring 25. The boat is brought near to the shore or landing and the boat operator leaps ashore holding the hand line. The trailer can then be again backed to the water's edge without immersing the wheels. The carriage may be moved to and locked in a distended position, cantilevered over the body of water. The jack wheel may be raised to lower the rear of the carriage. At this point the operator then pushes the boat outwardly away from the shore a good distance and then carefully pulls the boat by hand to the extended boat carriage of the trailer. The bow of the boat is then pulled between rear saddle rollers 19 until the curving bow or forward keel of the boat rests upon the rearmost keel roller 34. Winch line 44 may be attached to the upper bow ring after the hand line has been snubbed to winch support 29, as shown in FIG. 2. The winch is then used to draw the small craft into the cradle or saddle rollers of the boat carriage. Snap ring 46 is then put through the lower bow ring, anchoring the boat upon its carriage in the prelaunch position shown in FIG. 2. Continuing to draw with the winch, the carriage is then longitudinally displaced forwardly of the trailer after unlocking the carriage lock pin 38, until the carriage resumes the position shown in FIG. 1. Thereupon the lock pin engages a different hole in the carriage, securing it in the road position upon the trailer.

This operation is aided by proper manipulation of jack wheel 35 and its positioning crank 36. Depending upon the pitch of the incline approaching the water and upon the loaded weight of the boat, the rear of the cantilevered boat carriage may be elevated or depressed by proper manipulation of the crank.

With this basic explanation of the method whereby a small craft is launched from the trailer of the invention we will now turn to a detailed explanation of the embodiments of the trailer and the carriage.

The embodiment illustrated in FIGS. 1 through 7 has, in addition to intermediate transverse members 41B, rearward transverse framing members 41C and 41D. The transverse members span between outer stringers 51 of the trailer chassis and are attached as by welding to the bottom surfaces thereof.

Transverse members 41C and 41D and the more rearward of transverse members 41B have pairs of opposed carriage rollers 17A supported above their upper surfaces by roller holders 17B. The carriage rollers are spaced transversely and supported above the transverse members to engage outwardly opening side channels 53 of boat carriage 18. Rollers 17A guide the boat carriage as it moves longitudinally on the trailer chassis and restrain upward motion of the carriage. A plurality of support rollers 55 are rotatably supported on transverse members 41B and 41C and take the weight of the boat trailer upon their elongate peripheries.

Winch support 29 (see FIG. 6) may comprise a central post 61 having a horizontal platform 62 extending forwardly of the trailer from the post. A pair of post braces 63 may steady the post from trailer stringers 51. Winch 28, upon platform 62, has been illustrated as having a hand-driven, planetary-geared winch drum. However, the winch may be powered by an electrical source from the towing vehicle, hydraulically, or by other conventional means.

The winch support post rises from a central beam 64 that extends from plate 37 rearwardly to a trailer cross member 65. A stop plate 66 extends upwardly from beam 65 and serves as a forward stop for the boat carriage.

As illustrated in FIGS. 5 through 7, the front ends of both the trailer and the boat carriage have a relatively long taper. Such configuration is a matter of choice, or may be dictated by the configuration of the boat to be supported upon the carriage and trailer.

The boat carriage and the boat are cantilevered at launching in a position extended rearwardly beyond the wheels of the trailer chassis. It is therefore desirable to restrain the carriage from tilting with respect to the chassis. Restraint may be accomplished as illustrated in FIG.

7, by a pair of rollers 71, 72 rotatably fixed to angle supports 73, 74 respectively. The angles depend from a forward transverse member 76 of the boat carriage. Central stringer 41 is preferably T-shaped, and the rollers contact the lower surfaces thereof on either side of the stringer web. As the boat carriage moves longitudinally of the trailer chassis, the rollers move therewith, but still thrust against the lower surfaces of the stringer to restrain upward motion of the front end of the boat carriage as weight shifts with movement.

The embodiment of the invention shown in FIGS. 8 through 10, however, utilizes carriage rollers not only to guide the boat trailer as it moves longitudinally on the chassis, but also to restrain upward vertical displacement of the carriage with respect to the trailer chassis. A trailer 81 has a trailer chassis 82 comprising spaced parallel rear stringers 83, 84 joined at their rearmost portion by a transverse brace 87, a central transverse brace 88 fixed to the lower surfaces of the parallel stringers at a point forward of the drop axle and wheel assembly 89 of the trailer and diagonal braces 91 and 92 extending from the rear corners of the chassis to the middle of central transverse brace 88. Diagonal braces 93, 94 extend from the middle of brace 88 to a forward chassis brace 96 extending transversely between converging forward chassis stringers 98, 99. A carriage stop plate 101 extends upwardly from brace 96 and acts as a forward stop for a movable boat carriage 103.

Converging stringers 98, 99 are joined by welding at their point of convergence to a horizontal plate 105. A conventional ball and socket hitch 106 extends forwardly from plate 105. A jack wheel 35 and a crank assembly 36 are mounted to the plate and resemble in all respects the previously described jack wheel 35 and crank assembly 36 of FIGS. 1 through 7. A central beam 107 extends from plate 105 to transverse member 96. A winch stand 109 rises from a pad 110 on the central beam and supports a winch 28 similar to that of the previous embodiment. A winch line 44 has a snap ring fastener 29 on its free end.

A plurality of opposed roller pairs 111, 112, and 113, 114, and 115, 116, and 117, 118 extend inwardly like distances from chassis stringers 83 and 84. As shown best in FIG. 10, each of the carriage rollers, such as the rollers 117, 118, is mounted on a shaft 121 that extends through the box walls of the chassis stringer, through a thrust bearing 122 and into the roller. Preferably the roller itself has the same taper as the outwardly opening channels 124, 125 of boat carriage 103. Using the rollers shown and described in FIGS. 8 through 10, the boat carriage may be moved longitudinally on the trailer chassis, guided by the rollers and restrained thereby against vertical displacement with respect to the chassis also.

A plurality of transverse braces 131 through 135 extend between boat carriage side members 124, 125. Keel support rollers 137 are rotatably mounted on the transverse members. Saddle roller assemblies 138 are supported on adjustable brackets 139 that are secured to transverse braces 131 and 134 of the boat carriage.

Forwardly of brace 135, side members 124A, 125A converge to a forward brace 139. A stanchion 141 supports a bow yoke 142 above the front of the boat carriage. As described in regard to the embodiment of FIGS. 1 through 7, an aperture 143 in the upper end of the stanchion is adapted to accept lower bow ring 24 of a boat that the boat carriage is adapted to support. It may be desirable to floor the trailer chassis to protect the boat bottom against flying debris from the highway. A suitable plywood floor 151 may be disposed on transverse trailer braces 131 through 135 in the manner shown in FIG. 10. The flooring is removed in FIG. 8 so that the trailer chassis construction may be more easily grasped. However, it is shown fragmentarily in FIG. 9.

The carriage rollers provide both guidance and vertical restraint for the boat carriage. By extending the rollers from the side stringers of the trailer, the carriage moves substantially within the vertical confines of the stringers 83, 84.

A lower center of gravity may also be obtained by using a drop axle such as the axle 161 shown in the embodiment of FIG. 11. In FIG. 11 a trailer 162 having wheels 164, 165 on axle 161, with fenders 166, 167, has a boat carriage 169 mounted for longitudinal motion upon carriage rollers 171 of the trailer chassis. The carriage rollers extend from trailer chassis box stringers 173, 174. The trailer 162 and the boat carriage 169 are in all material respects the same as those described with respect to the embodiment of FIGS. 8 through 10.

A longitudinal floor member 181 is fixed by a plurality of round head bolts to the top surface of the trailer chassis stringer 173. A similar floor member 185 is similarly secured to trailer stringer 174. Each of the floor members extends outwardly from the trailer stringers over and beyond the wheels and fenders of the trailer. Fender wells 191, 192 extend upwardly from the floor members to receive the trailer fenders, with clearance being provided for displacement of the fenders due to road shock. A rectangular enclosure 195 is supported upon the floor members. The enclosure may be conventionally braced as shown. A rear flap door 196 closes the rear of the enclosure. Side walls 198, 199 of the enclosure extend downwardly below the floor members.

The enclosure forms a protective cover for the boat while in transit or while being stored. The enclosure may also be used after the boat has been launched from its carriage 169 as a camper cover. By removing bolts 183, the camper or enclosure may be detached from the boat carriage. In order to accomplish removal, a plurality of jacks 201 are used. The jacks are positioned on both sides, front and rear, at the bottom of side walls 198, 199. The enclosure is lifted by the jacks above the vertical extent of the trailer fenders. After flap door 196 is opened the trailer and boat carriage may be removed rearwardly from the enclosure. If it is desirable to move the trailer and boat carriage with a towing vehicle, a wide front door may be provided so that the trailer and boat may be removed forwardly by the towing vehicle.

The trailer chassis of the embodiment of FIGS. 8 through 11 does not have a central stringer such as the stringer 41 of the embodiment of FIGS. 1 through 7. Therefore a different boat carriage stop pin arrangement must be provided. A spring-loaded stop pin assembly 205 is shown in FIGS. 8 and 9 fixed to a chassis stringer 84. A stop pin control 206 is fixed to a forward portion of the stringer adjacent the position of the bow yoke of the boat carriage when the boat carriage is in its forward position on the trailer chassis. The control is thus handy to the winch. A linking rod 207 extends from stop pin assembly 205 to control handle 206 along the side of the trailer.

In FIGS. 13 and 14 the stop pin assembly is shown in more detail. A stop pin 211 extends into one of a plurality of registry holes 213 in the vertical web 214 of boat carriage stringer 125. The pin extends through a guide tube 215 that pierces both vertical walls of the box stringer 84. The box stringer is braced by transverse framing members like member 87 as previously described. A cylindrical spring housing 217 is joined to the guide tube and has ears 217A, 217B by which the housing and tube are secured to the stringer by means like round head screws 218. A pin spring 211 surrounds the shank 211A of the stop pin within the housing. The spring is confined between flat washers 223, 224 held in place by C-rings 225, 226 lodged in recesses (not shown) in the pin shank. Housing 217 has peripheral slots 228 through which portions of a snap ring 229 protrude to act as a stop for flat washer 223.

The stop pin terminates in a lever arm 231 best seen in FIG. 14. The lever arm extends at right angles to the pin shank and rides against a cam surface 233 on the end of the housing. The cam surface approximates 180° of the end circle and slopes toward the registry end of the pin from bottom to top as shown in FIG. 14. The spring urges the pin leftwardly in the figures so that the lever arm is urged into the registry or lock position shown in FIG. 13, protruding through the web of carriage side channel 125.

Linking rod 207 is pivotally joined to a flattened end 235 of the pin lever arm by a bolt, nut and washer assembly such as the assembly 236. The rod extends frontwardly of the trailer from the lever arm parallel to chassis stringer 84 passing through one or more guides 237 extending from the stringer. The rod terminates in a right angle control arm 206 after extending through a slotted cylinder 239. The cylinder is supported upon an angle bracket 241 attached to stringer 284. The cylinder is in substantial alignment with pin lever arm 235. Control arm 206 is adapted to be pulled out of the cylinder slot 243 so that it may be turned downwardly into the dotted position 206A within a notch 244 in support bracket 241. In order to withdraw from the slot the control arm must be pulled against the pressure of a compression spring 245 that is fixed between the unslotted end of cylinder 239 and a pinned washer 246 upon the linking rod.

The locking pin is disarmed by pulling control arm 206 forwardly of the trailer and turning it downwardly so that it lodges in notch 244. This motion pivots lever arm 235 of the lock pin along cam surface 233, causing the pin to withdraw against the pressure of spring 221 out of registry hole 213 and back within the confines of guide tube 215. Carriage 103 may then be moved freely longitudinally of the trailer chassis without interference by the locking pin.

A pivot connection 247 may be used intermediately of the length of rod 207 to give freedom of motion for the rotation of control arm 206. The disarmed position of the locking pin lever arm is shown at 250 in dotted lines of FIG. 14.

The locking pin illustrated in FIGS. 13 and 14 is one example of a means for selectively securing the carriage with respect to the trailer chassis. Other similar arrangements may be used. However, with the embodiment of FIGS. 13 and 14 a plurality of registry holes 213 may be drilled or punched in carriage side member 125 so that the carriage may be locked conveniently at several selected positions during longitudinal traverse of the trailer. When control arm 206 is in slot 243, lever arm 235 is aligned with the most leftward penetration of the cam surface. Thus, if the end of locking pin 211 is not aligned with a registry hole, it will be pressured by spring 221 into contact with the surface of web 214 of carriage side channel 125. The pin end is rounded so that little friction occurs as the carriage moves along the pin. The pin is armed to spring into the next successive registry hole 213 along the length of side channel 125. An operator may therefore use the lock pin to control the extent of longitudinal movement of the carriage and from a position near the winch.

Such control is particularly desirable with the embodiment of the invention shown in FIGS. 15, 16, 17. In FIG. 15 a trailer designated generally by the reference character 261 has wheels 261A and a trailer chassis 262 substantially like that described with respect to FIGS. 8 through 10. The trailer chassis has a plurality of carriage rollers 265 which guide and support a movable carriage 267. The general configuration of carriage 267, hereinafter called the "camper carriage," is illustrated in FIGS. 16 and 17. Camper carriage 267 has a rectangular configuration defined by side channels 269, 271, a rear transverse member 272 and a front transverse member 273. The side channels open outwardly to contact the rollers. A plurality of intermediate transverse members 274 may extend between side channels 269, 271. Vertically aligned tubes 276, 277 in the corners formed by the juncture of side channels 269 and 271 and the rear transverse member 272 are horizontally drilled to receive locking pins 278 that may be fastened by chains to the rear transverse member. Removable ground wheels 281 each have a long shank 282 adapted to slide upwardly into the tubes. Each shank 282 has a plurality of spaced horizontal holes 284 to receive a locking pin 278. A similar pair of ground wheels 281A, 281B are slidable within pivoted tubes 286, 287 respectively. The pivot tubes are pivotably mounted within sleeves 289 preferably fixed to front transverse members 273. A locking pin 291 may be used to lock the shank 292 of each pivotable tube in either horizontal or vertical alignment. The pivoting tubes are so mounted that wheels 281A, 281B may be turned upwardly within the volume defined by the framing members of the camper carriage and not interfere with longitudinal motion of the carriage upon the trailer chassis.

As shown in FIG. 15, an enclosure 295 is fixed by means of a floor 296 to the top of camper carriage 267. The floor is preferably of thick plywood and extends outwardly beyond the wheels and fenders of the trailer chassis. While a generally rectangular enclosure is shown, the general outward configuration of the enclosure is not germane to the invention, and will be determined by its use. Preferably the enclosure has rearwardly opening doors 301, 302. The doors may be hinged to sides 304, 305 of the enclosure. Fender tunnels 306, 307 extend from slightly aft of the trailer wheels through a forward wall 308 of the enclosure. In FIG. 12, the forward wall has small hinged doors 311, 312 that give access to the interior of the enclosure and provide for passing a winch line from a winch 314 to a hitch ring 315 fixed to the forward transverse member of the carriage. The front wall is also provided with flap doors 317, 318 that permit passage of the trailer wheels from wheel tunnels 306, 307. Winch 314 is mounted to the trailer chassis in the manner previously described with respect to the embodiments of the trailer previously shown.

Floor 296 of the camper carriage enclosure has affixed to it a plurality of carriage support rollers 321, 322. The carriage rollers may be supported in any convenient fashion. However, the bracket 324 shown in FIGS. 15 and 16 is preferable since it is compatible with the mounting means for the rollers used in the embodiments of FIGS. 8 through 10. The bracket is secured directly to the floor and moves therewith. The rollers are spaced transversely the same distance as carriage rollers 265 of the trailer chassis. The longitudinal space between rollers may or may not differ from the spacing of the rollers 265 on the trailer chassis.

A boat carriage 103, substantially identical to that shown and described with respect to FIGURES 8 through 10, is supported and guided by rollers 321, 322. The boat carriage, as shown in FIG. 15 may be lodged with a mounted boat 326 within enclosure 295. The boat carriage may have a forward locking pin (not shown) similar to that shown with respect to the embodiment of FIGS. 1 through 7. The locking pin is adapted to register in registry holes 331, 332, 333 of the camper carriage. These registry holes are vertically oriented in a central stringer 335 of the camper carriage frame. Aligned holes extend through floor 296 of the camper carriage so that the pin from the boat carriage may be dropped through the registry holes. Obviously registry hole 331 receives the locking pin when the boat carriage is in the forward, or road, position upon the camper carriage. A locking pin similar to pin 211 registers in the rearmost registry hole of side channel 269 of the camper carriage when the two carriages are assembled on a single trailer chassis in road position. The two carriages are thus secured with respect to one another and the trailer.

As has been shown, FIGS. 12, 15, 16, 17 illustrate an embodiment of the invention combining a boat or camper enclosure with a boat-supporting carriage upon a single trailer chassis. The carriage support rollers of the trailer chassis and those of the enclosure are similarly located with respect to one another so that either the camper carriage or the boat carriage may be mounted to the trailer chassis. With properly engineered ground wheels 281 through 281B, the enclosure, with a laden boat carriage may be removed from the trailer chassis in one operation. This operation entails attaching the winch line to ring 315 of the camper carriage while the boat is securely locked to its carriage and the boat carriage is securely locked to the camper carriage. A wheel jack similar to crank and wheel assembly 36 of FIGS. 1 through 7 may be used to elevate the hitch end of the trailer chassis so that the camper carriage rolls rearwardly, displacing longitudinally along the trailer chassis. The wheel tunnels 306, 307 provide clearance for the trailer wheels and fenders so that the enclosure may be removed from the trailer without the necessity of enclosure lift jacks.

As soon as the camper carriage protrudes a foot beyond the rear of the trailer a pair of ground wheels 281 may be inserted into tubes 276, 277. The extent of the shanks from the tubes depends upon the pitch of the trailer and the terrain over which the unloading is taking place. As winch 314 is unwound, longitudinal rearward displacement of the camper carriage takes place. The winch is used to control rearward displacement and the locking pin is armed or disarmed to arrest camper carriage motion to make adjustments in ground wheel heights, or to place footing planks beneath the wheels, etc. Doors 311 and 312 remain open during this period to give clearance to the winch line and access to the boat carriage.

When the camper carriage is still in engagement with the last roller pair on the trailer chassis, the pins 291 may be pulled and ground wheels 281A, 281B turned down into support position. Pins 291 are then replaced to lock the pivot tubes in vertical orientation. Unwinding of the winch is then resumed and the camper carriage and the boat carriage are removed from the last support rollers so that they rest fully upon the ground wheels.

It is preferable to remove the boat carriage first. This may be done by opening rear doors 301, 302 of the enclosure and winching the boat carriage from the support rollers of the camper enclosure. Boat carriage 103 may also have ground wheels such as those on the camper carriage shown in FIG. 16, or the boat carriage may be moved directly onto a storage rack having support rollers similarly oriented to those on the trailer chassis.

In the previously described manner, the boat may be launched directly from a boat carriage in position upon the support rollers of the camper enclosure. Depending upon the shore incline, it may or may not be necessary to employ crank and wheel assembly 36 to achieve proper tilt for launching. Once again launch is under the control of the winch and its line, with the boat remaining secured to the boat carriage until the boat carriage is cantilevered out over the water and locked in that position, as by pin 38. At this point the boat may be disengaged from its carriage and winched out along the saddle rollers and keel rollers until it is floating freely in the water.

The embodiment of FIGS. 12, 15, 16 and 17 is adapted to extended trips where there is a desire to protect the boat in the enclosure, or for carrying a camping enclosure and the boat on the same trailer. The camper carriage may be left at a camping site and the boat carriage reassembled upon the trailer and taken to a launching site. In remounting, the height of the rear end of the chassis of the trailer may be altered to meet the height from the ground of the open side channels of the carriage by means of the crank jack wheel assembly described in previous embodiments. Since the trailer chassis extends rearwardly of the trailer wheels, any elevation of the jack wheel results in a substantial lowering of the rear end of the trailer, repositioning the last roller pair on the chassis.

Another advantage of the dual carriage embodiment is that the upper, or boat, carriage may be extended upon the lower, or camper, carriage. Such extension may take place in a relatively simple launch of the boat from the boat carriage to the water. Alternatively, if the weight ratio between the boat and the towing vehicle is proper, the boat carriage may be extended longitudinally of an extended camper carriage. With both carriages extended and locked in position with respect to the trailer, the boat can be put into the water at a greater distance from the shore-based trailer wheels.

Many other alternatives within the scope of the invention will occur to those skilled in the art. Therefore, I desire the invention to be defined by the appended claims and not limited to the illustrative embodiments disclosed herein.

I claim:
1. A highway trailer for hauling and launching a boat comprising a wheeled trailer chassis, an enclosure carriage, an enclosure on the carriage adaptable to encompassing the boat, a boat carriage, means securing selectively one of the carriages to the chassis for longitudinal movement thereon, carriage support rollers fixed to the enclosure carriage and adapted to receive the boat carriage thereon for longitudinal movement with respect to the enclosed carriage, carriage locking means for selectively preventing longitudinal boat carriage motion relative to the trailer, boat support means on the boat carriage, boat locking means on the boat carriage for fixing the boat relative to the carriage, means for tilting the trailer chassis about its wheels to depress the trailer remote from its hitch to a towing vehicle, and means adapted to control longitudinal motion of each carriage relative to the chassis and longitudinal motion of the boat relative to the boat carriage.

2. Apparatus in accordance with claim 1 in which the means adapted to control longitudinal motion of each carriage and the boat comprises a winch and line mounted to the hitch end of the trailer, and means on each of the enclosure carriage, boat carriage and boat for securing the free end of the winch line thereto.

References Cited by the Examiner

UNITED STATES PATENTS

| 2,586,485 | 2/52 | Schroeder | 214—84 |
|---|---|---|---|
| 2,797,008 | 6/57 | Banker | 214—505 |
| 2,838,191 | 6/58 | Schramm | 214—505 |
| 2,847,136 | 8/58 | Neff | 214—500 |
| 2,876,036 | 3/59 | Olson | 280—414 |
| 2,977,010 | 3/61 | Okey | 214—500 |
| 3,011,670 | 12/61 | Chatterton et al. | 214—505 |
| 3,067,892 | 12/62 | Barrett et al. | 214—84 X |
| 3,116,949 | 1/64 | Muse | 214—500 X |
| 3,138,271 | 6/64 | De Lay et al. | 214—84 X |

FOREIGN PATENTS 559,466   6/58   Canada.

HUGO O. SCHULZ, *Primary Examiner.*

GERALD M. FORLENZA, *Examiner.*